United States Patent [19]

Maruyama et al.

[11] Patent Number: 5,369,633
[45] Date of Patent: Nov. 29, 1994

[54] DIGITAL SIGNAL TRANSMISSION SYSTEM HAVING MONITOR EQUIPMENT

[75] Inventors: Akira Maruyama; Shuji Kimura; Shigeki Yamada; Hiroaki Shirai; Hiroichi Nara; Kazunori Hanaeda, all of Kawasaki, Japan

[73] Assignee: Fujitsu Limited, Japan

[21] Appl. No.: 888,799

[22] Filed: May 27, 1992

[30] Foreign Application Priority Data

May 27, 1991 [JP] Japan ................................. 3-120543

[51] Int. Cl.[5] .............................................. H04J 3/14
[52] U.S. Cl. .................................... 370/13; 370/68; 371/15.1
[58] Field of Search .................. 370/13, 58.1, 63; 379/9, 10, 15, 16; 371/15.1, 22.1, 24, 27; 341/94, 100, 101

[56] References Cited

U.S. PATENT DOCUMENTS

| | | | |
|---|---|---|---|
| 4,022,979 | 5/1977 | Smith | 379/16 |
| 4,296,492 | 10/1981 | Hafer | 379/15 |
| 4,455,647 | 6/1984 | Gueldner | 370/13 |
| 5,138,608 | 8/1992 | Kucera et al. | 370/13 |

*Primary Examiner*—Benedict V. Safourek
*Attorney, Agent, or Firm*—Staas & Halsey

[57] ABSTRACT

A digital signal transmission system having monitor equipment including a serial/parallel (S/P) converter and a parallel/serial (P/S) converter both. The S/P converter is checked by the aid of a first monitor signal generating circuit that parallel distributes a pass pattern signal given at the input side of the S/P converter to respective individual channel lines for achieving a pass pattern check. The P/S converter is checked with the aid of a second monitor signal generating circuit that receives respective pass pattern signals given, at the input side of the P/S converter, to a multiplexed channel line sequentially at every frame to achieve a pass pattern check.

11 Claims, 13 Drawing Sheets

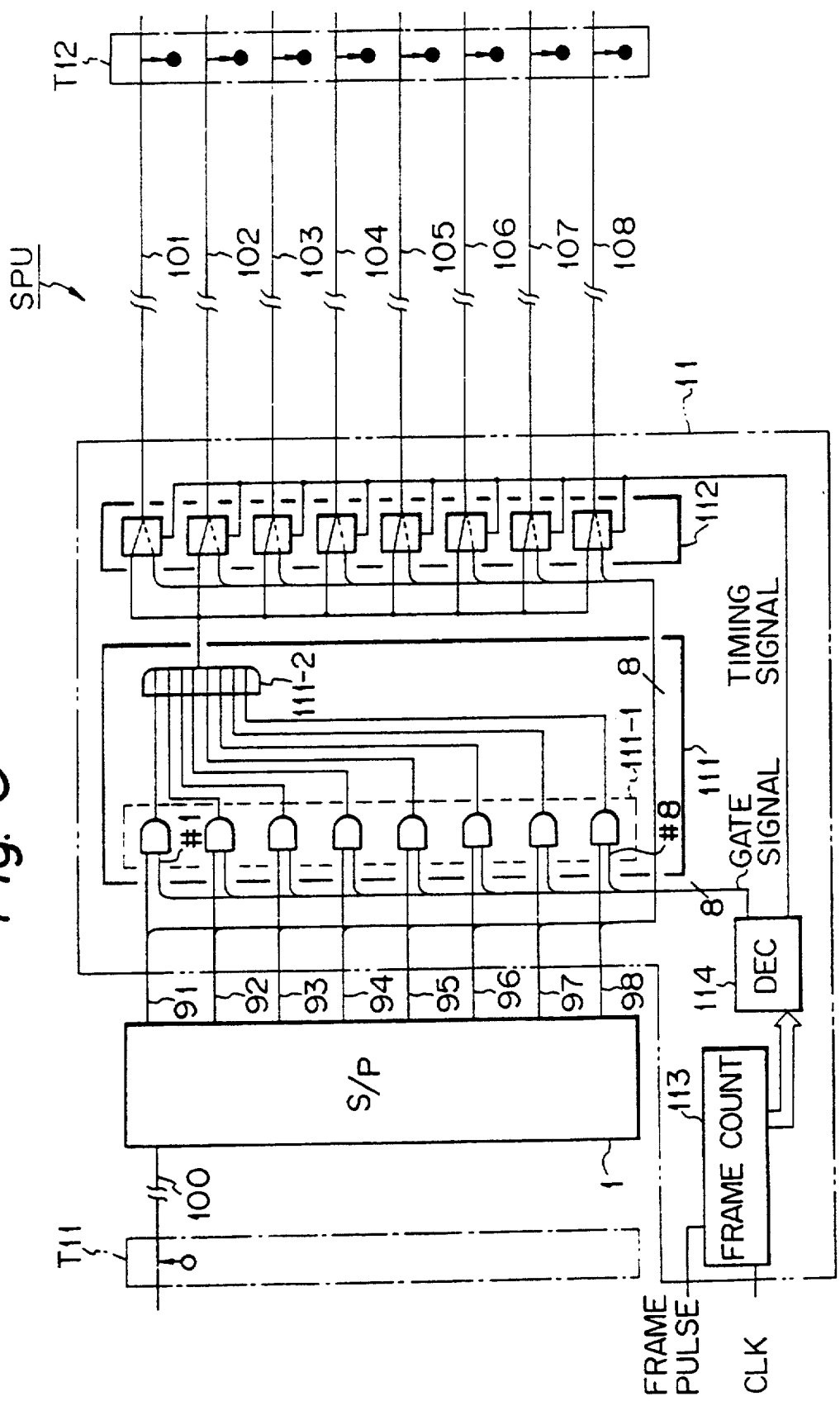

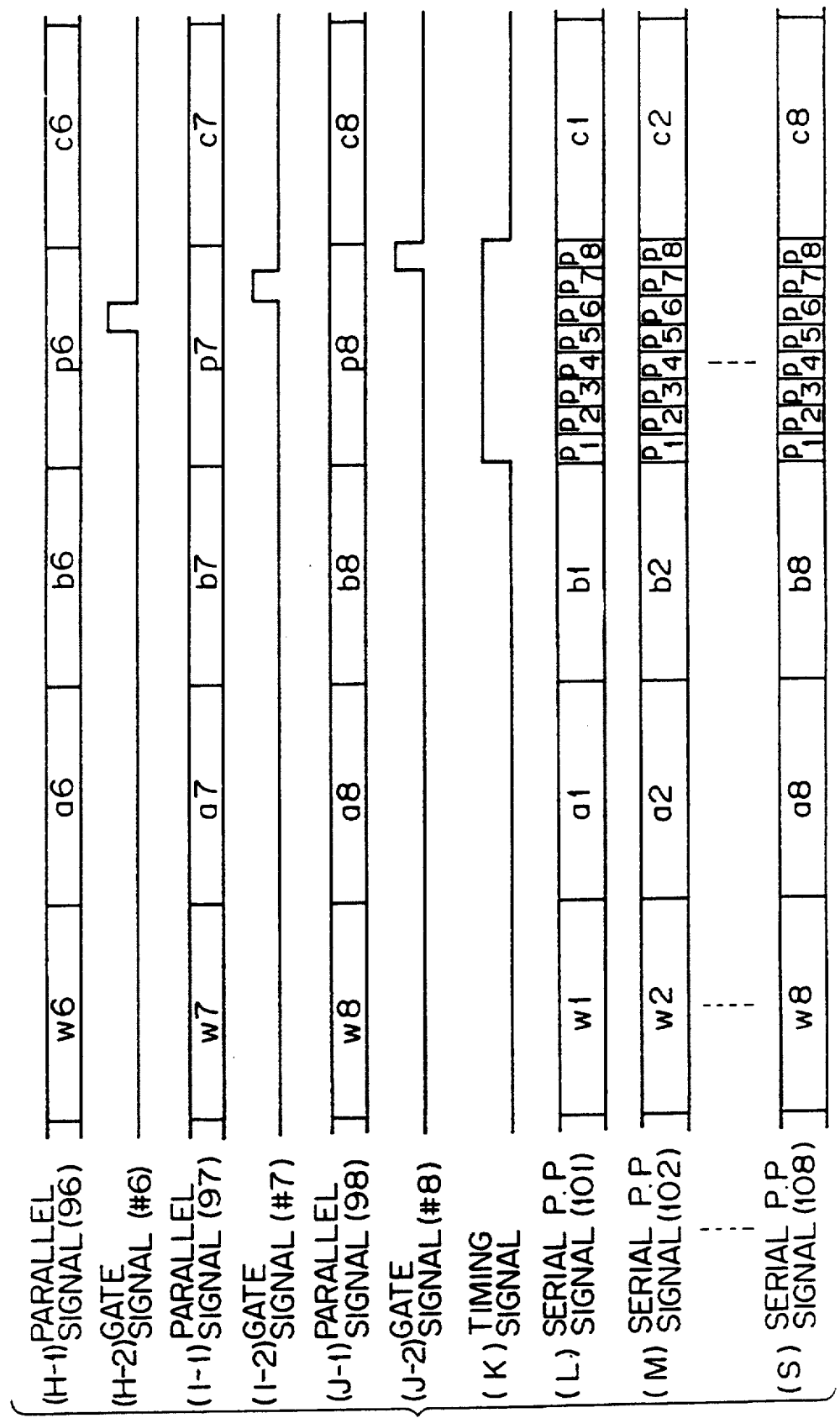

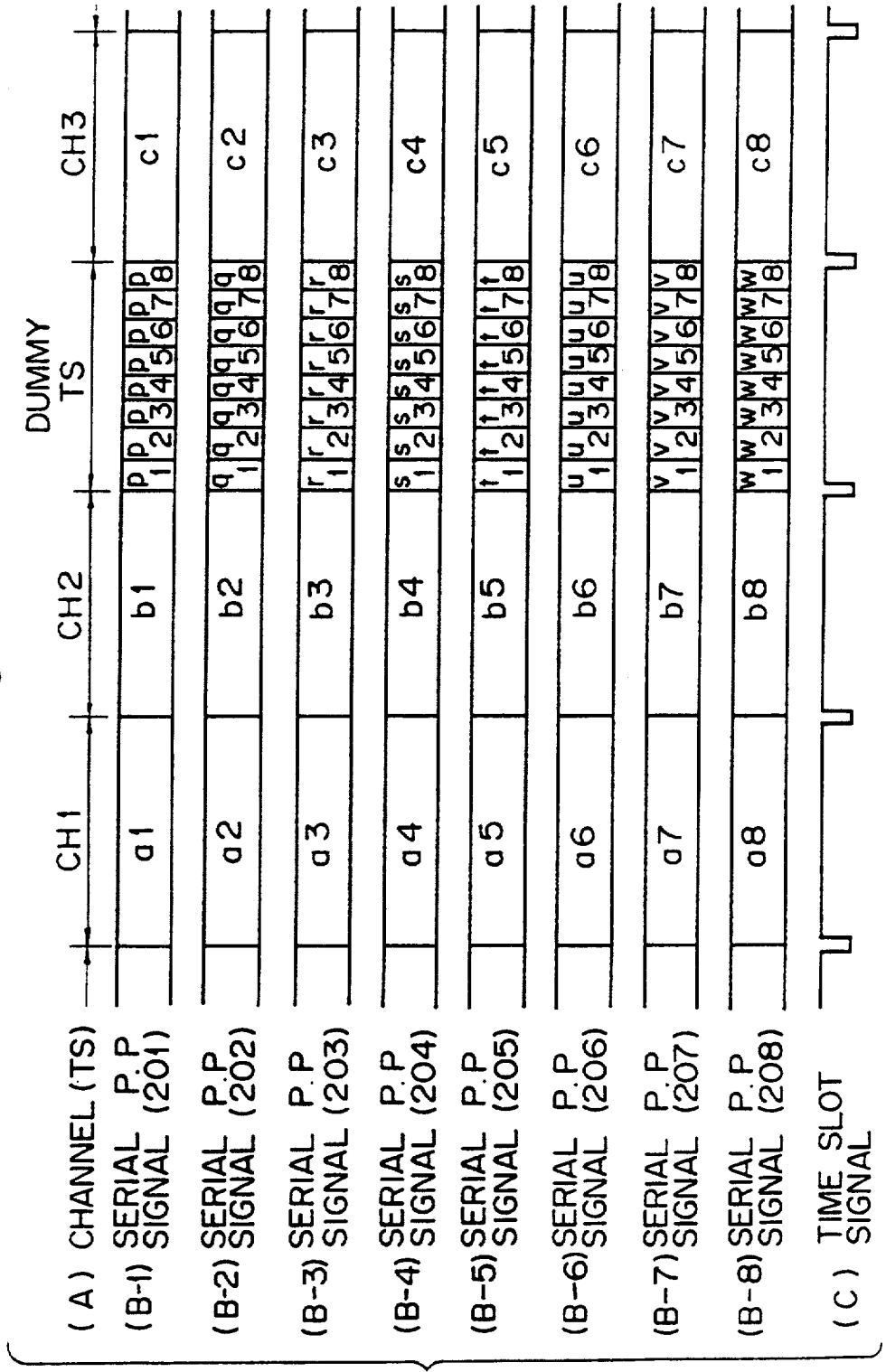

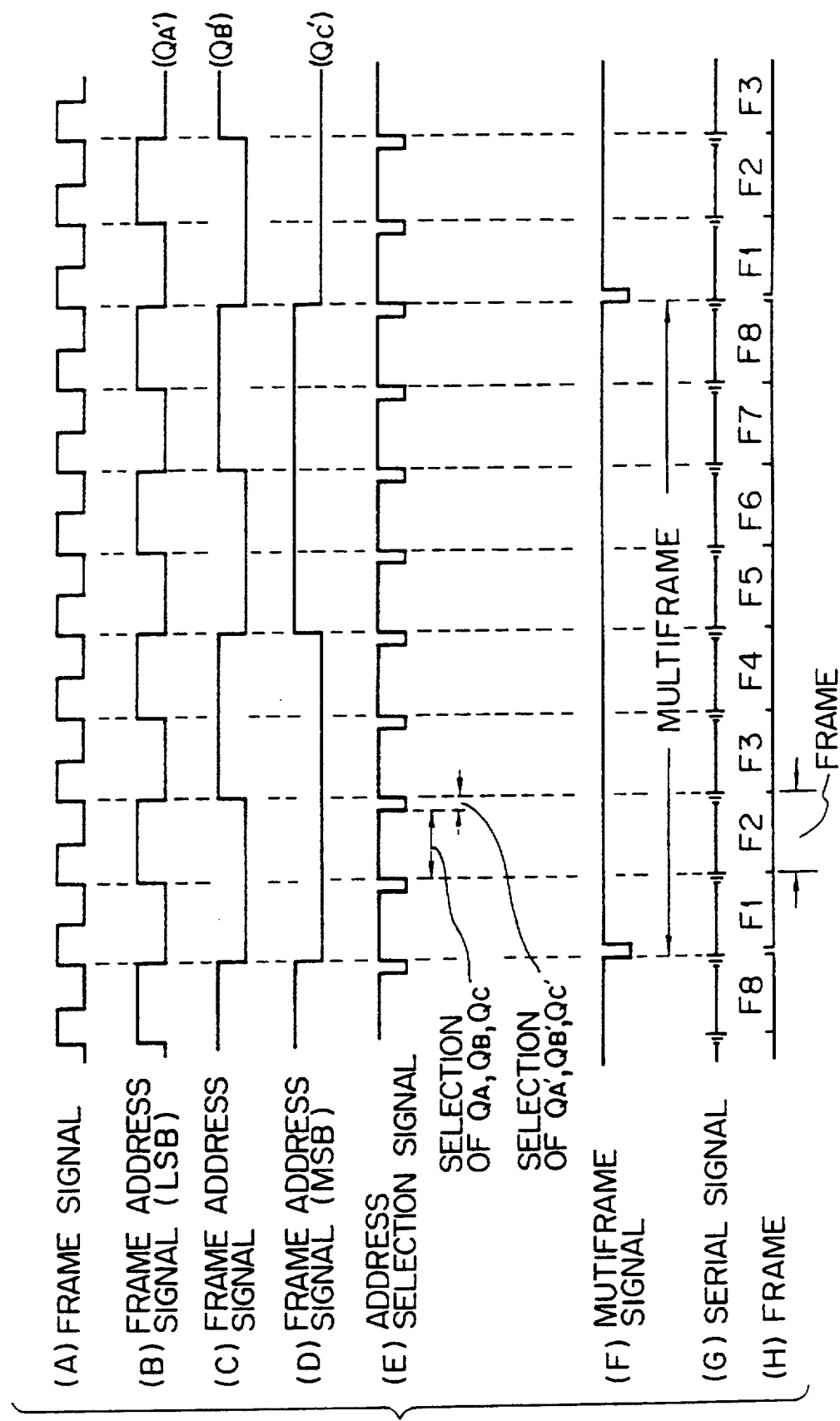

DIGITAL SIGNAL TRANSMISSION SYSTEM HAVING MONITOR EQUIPMENT

BACKGROUND OF THE INVENTION

1. Field of the Invention

The present invention relates to a digital signal transmission system having monitor equipment.

The recent rapid progress in the field of a communication technique greatly relies upon a digital transmission system that operates to transmit digital signals, such as telephone signals, a variety of data signals and so on, under a time division multiplex mode. Therefore, there is a strong demand for a reliable monitor of a related digital signal transmission system. That is, it is necessary to determine if fault occurs in the digital signal transmission system, the location of the fault therein and further to restore the related faulty portion quickly and correctly.

The present invention therefore provides a digital signal transmission system having monitor equipment that can easily achieve the monitor.

As will be explained later, the digital signal transmission system is comprised of, as major parts, a serial/parallel converter and a parallel/serial converter, which play an important role when the digital signal transmission system is incorporated into a socalled highway transmission line, to increase the transmission efficiency of the signals, i.e., an increase in the transmission speed and provision of an economical facility, and thus the converters are essential for a highway transmission line. This being so, it is very effective to monitor these converters per se to improve the maintenance of the highway transmission line and also reliability thereof.

2. Description of the Related Art

Conventionally, the digital signal transmission system is monitored by the use of a well known parity check and a pass pattern check, which will be explained hereinafter.

However, in the conventional digital signal transmission system having monitor equipment there are the following problems.

(1) it is difficult for the monitor equipment to achieve a monitor of the aforesaid serial/parallel (S/P) and parallel/serial (P/S) converters per se, and (2) much hardware is required for constructing the monitor equipment in the digital signal transmission system. In actuality, there has been no practical monitor equipment that can monitor the inside of each of said S/P and P/S converters.

SUMMARY OF THE INVENTION

Therefore, the present invention, in view of the above problems, strives to provide monitor equipment incorporated in a digital signal transmission system that is simple in construction, and is capable of monitoring the S/P and P/S converters per se, i.e., internal circuits of the S/P and P/S converters.

To attain the above object, the monitor equipment of the present invention is basically comprised of:

a first means for receiving parallel pass pattern signals passing through a S/P converter and applying the same, after conversion into a serial pass pattern signal, to respective channel lines for achieving respective pass pattern checks, and a second means for receiving each serial pass pattern signal sent parallel from respective channel lines and applying the same, after conversion into serial pass pattern signals occurring at every frame sequentially, to a multiplexed channel line for achieving a pass pattern check of each channel.

BRIEF DESCRIPTION OF THE DRAWINGS

The above object and features of the present invention will be more apparent from the following description of the preferred embodiments with reference to the accompanying drawings, wherein:

FIG. 5 is a circuit diagram of an example of a first monitor signal generating circuit 11 shown in FIG. 4;

FIG. 6A and 6B is a timing chart explaining the process of a generation of the first monitor signal;

FIG. 8A, 8B, 8C and 8D is a timing chart explaining the operations performed in the circuit shown in FIG. 7.

DESCRIPTION OF THE PREFERRED EMBODIMENTS

Before describing the embodiments of the present invention, the prior art and the problems therein will be first described with reference to the related figures.

Figure 1:
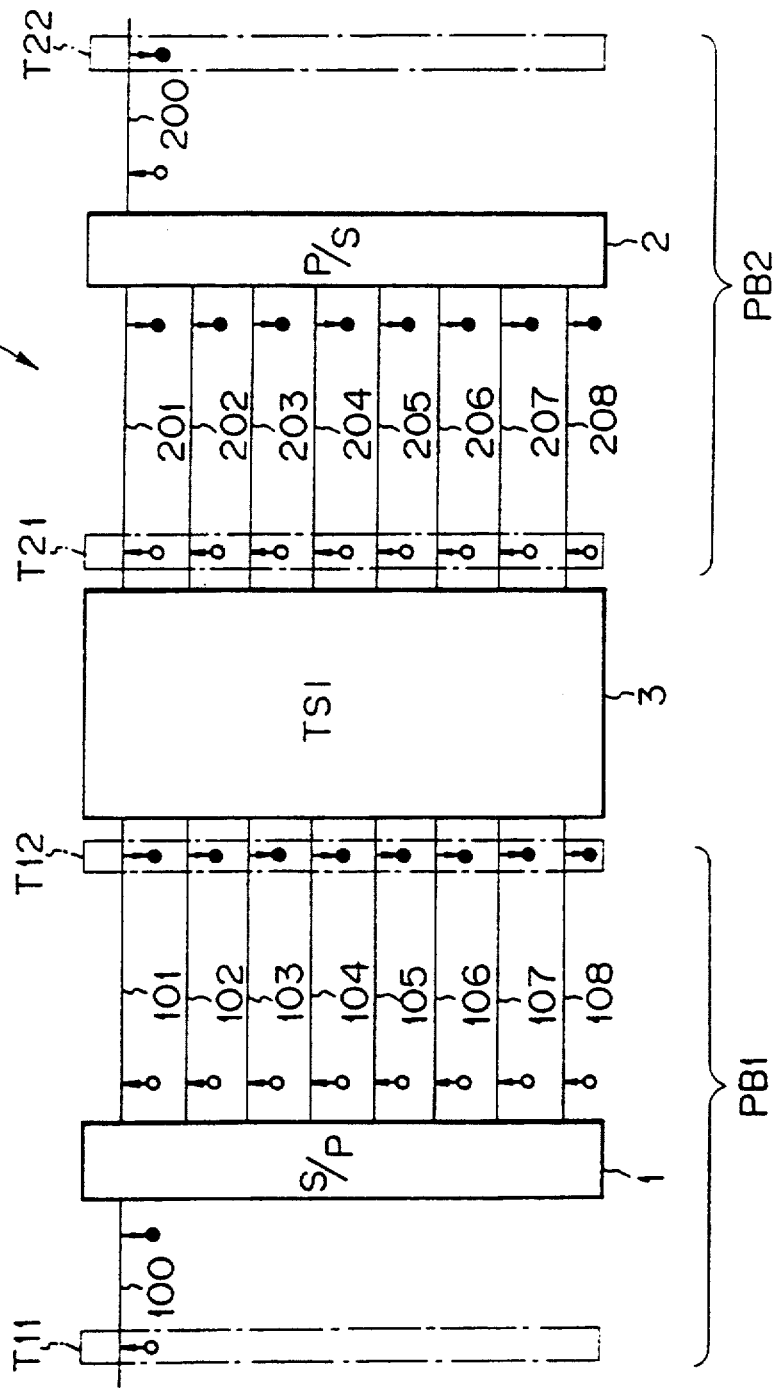
FIG. 1 is a block diagram of a typical and conventional digital signal transmission system having monitor equipment.
Figure 2:
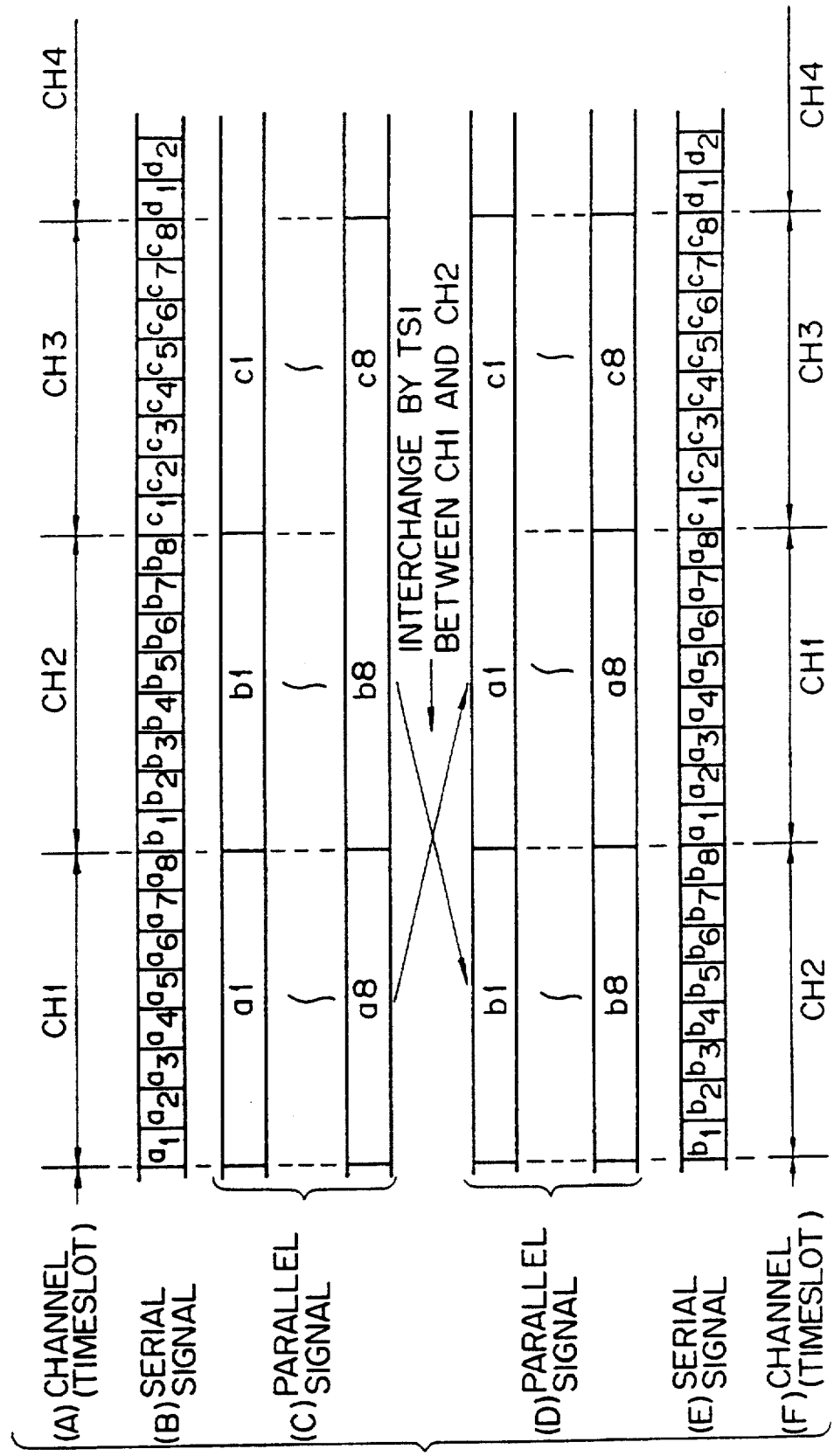
FIG. 2 is a timing chart explaining the operation of the system shown in FIG. 1.

FIG. 1 is a block diagram of a typical and conventional digital signal transmission system having monitor equipment and FIG. 2 is a timing chart explaining the operation of the system shown in FIG. 1.

Referring to both FIGS. 1 and 2, reference numeral 1 represents a serial/parallel (S/P) converter to which a serial signal is input via a multiplexed channel line 100. The serial signal is shown in row (B) of FIG. 2. The serial signal of row (B) is converted into parallel signals shown in row (C) of FIG. 2, parallel signals of which are distributed to respective individual channel lines 101 through 108.

The S/P converter 1, the multiplexed channel line 100 and individual channel lines 101 through 108 are usually loaded on the same printed board PB1 for the S/P. The aforesaid serial signal of row (B) in FIG. 2 is input from an input terminal T11 mounted on the above printed board PB1. The aforesaid parallel signals of row (C) in FIG. 2 are output from output terminals T12 mounted on the above printed board PB1.

Each serial signal given from the input terminal T11 is a digital signal multiplexed as shown in row (B) of FIG. 2. Each serial digital signal is composed in the form of a frame as usual. That is, each frame is composed of a time slot as shown by CH1, CH2, CH3 ... as shown in row (A) of FIG. 2. Note that the digital signal on each of these time slots corresponds to respective channels, and thus the time slots are expressed as the channels CH1, CH2, CH3 ....

The channels CH1, CH2, CH3 . . . , i.e., the time slots, are composed of 8 bits, respectively, as shown in row (B) of FIG. 2. Namely, the channel CH1 is composed of an 8-bit signal with bit a1 through bit a8. Similarly, the channels CH2 and CH3 are composed 8-bit signals with bit b1 through b8 and bit c1 through c8, respectively.

Since each time slot is composed of 8 bits, 8 parallel signals are produced as shown in row (C) of FIG. 2. For this, 8 individual channel lines 101 through 108 are provided to match with the 8 bits, as illustrated in FIG. 1.

The parallel signals from the S/P converter are applied to a time slot interchanger (TSI) 3 located at the center of the digital signal transmission system, wherein an interchange between the two channels (two time slots) is performed.

The interchange is performed between, for example, the channel CH1 and the channel CH2 as seen at the portion between rows (C) and (D) of FIG. 2 by means of the interchanger (TSI) 13. Thus the parallel bits a1 through a8 and b1 through b8 of row (C) are interchanged to the parallel bits b1 through b8 and a1 through a8 of row (D).

The thus interchanged parallel signals from the time slot interchanger (TSI) 3 are distributed to respective 8 individual channel lines 201 through 208, as shown in FIG. 1, to reach a parallel/serial (P/S) converter 2, wherein the parallel signals are converted again into a serial signal as shown in row (E) of FIG. 2 and then output on a multiplexed channel line 200. The serial signal of row (E) corresponds to a multiplexed digital signal obtained by interchanging the serial signal of row (B) input to the S/P converter 1, between the channels CH1 and CH2, at the interchanger (TSI) 3.

The P/S converter 2, the multiplexed channel line 200 and the individual channel lines 201 through 208 are usually loaded on the same printed board PB2 for the P/B, as in the printed board PB1. The aforesaid parallel signals of row (D) in FIG. 2 are input from input terminals T21 mounted on the board PB2. The aforesaid serial signal on the line 200 is output from an output terminal T22 mounted on the same board PB2. Incidentally, the time slot interchanger (TSI) is mounted on a similar printed board (PB) dedicated thereto.

Figure 3:
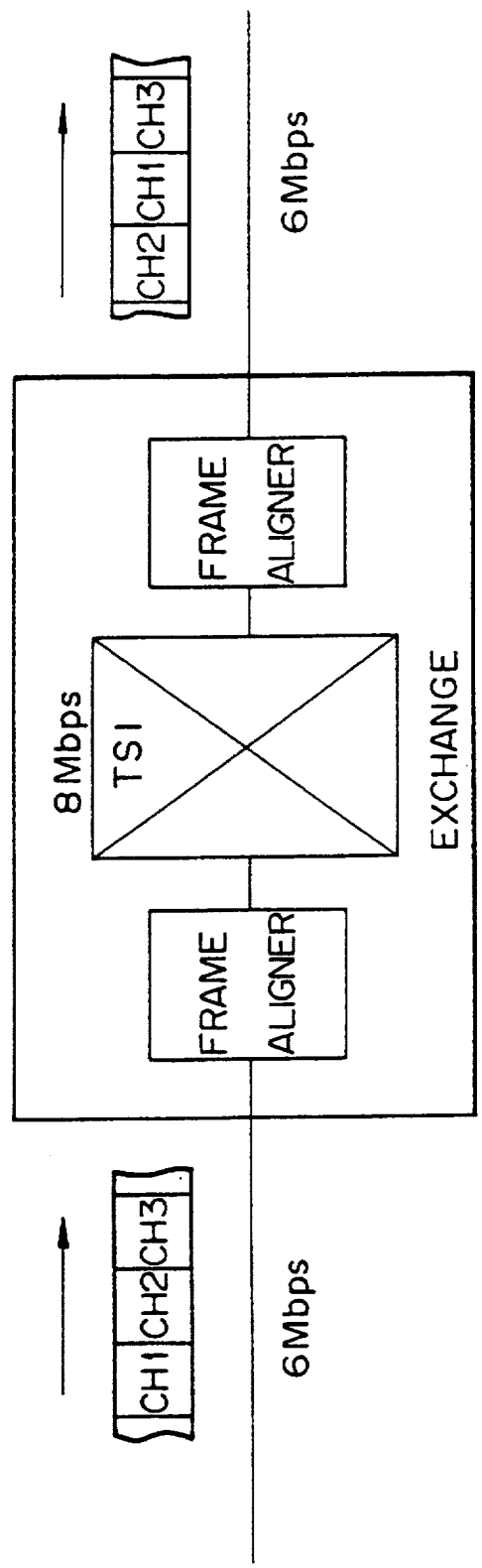
FIG. 3 is a block diagram explaining an operation that is equivalent to the operation of the system shown in FIG. 1.

FIG. 3 is a block diagram explaining an operation that is equivalent to the operation of the system shown in FIG. 1. The system of FIG. 1 can be expressed generally as an exchange. The exchange has, as its major part, a switching network that is equivalent to the aforesaid time slot interchanger (TSI) 3. The incoming and outgoing lines, as the aforesaid highway transmission line, operate at, e.g., 6 Mbps, while, the internal circuit of the exchange operates at a higher speed than the incoming and outgoing lines, e.g., 8 Mpbs, in order to gain an operational margin. In order to adjust the difference in speed, frame aligners are needed.

Referring again to FIGS. 1 and 2, when a fault occurs in the system of FIG. 1, the electronic circuits on the aforesaid printed boards (PB) are monitored individually. To be specific, the electronic circuit of the printed board mounting the interchanger (TSI) 3 is monitored by the use of a well known parity check, since the interchanger (TSI) primarily consists of a random access memory (RAM). In general, a memory circuit is suitable for the parity check. On the other hand, the electronic circuits of the printed boards PB1 and PB2 mounted on the S/P and P/S converters are monitored by the use of a pass pattern check.

In this case, it is possible for the interchanger (TSI) 3 to be monitored even inside thereof. Contrary to the above, as previously mentioned, the inside of the S/P and P/S converters 1 and 2 cannot be monitored. Therefore, the pass pattern check is applied, on the printed board PB1, to the electronic components other than the S/P converter 1. Also, the pass pattern check is applied, on the printed board PB2, to the electronic components other than the P/S converter 2. That is, the pass pattern check is applied only to the multiplexed channel line 100, the individual channel lines 101 through 108, the individual channel lines 201 through 208 and the multiplexed channel line 200, separately and independently. It should be understood here that the above lines are illustrated as simple lines in the figures, but, in actuality, each line is provided with, in series thereto, other electronic circuits, such as a buffer, a noise filter and the like.

In FIG. 1, each small white circle with an arrow indicates an input port to which the pass pattern signal of the aforesaid pass pattern check is input, while, each small black circle with an arrow indicates an output port from which the pass pattern signal of the aforesaid pass pattern check is output, the output pass pattern signal of which is a signal to be monitored. A typical pass pattern signal is composed of an alternative and continuous "0" and "1" bit train.

Specifically, when the pass pattern check is achieved on the printed board PB1, the pass pattern signal is input to the input port at the input terminal T11 and then the thus input pass pattern signal is taken from the output port at the input side of the S/P converter 1, whereby the multiplexed channel line can be monitored. Similarly, the pass pattern signals are input to the respective input ports at the output side of the S/P converter 1 and then the thus input pass pattern signals are taken from the output ports of the output terminals T12, whereby the individual channel lines 101 through 108 can be monitored. The above operations are also achieved on the printed board PB2. Namely, the pass pattern signals are input to the input ports at the input terminal T21 and then the thus input pass pattern signals are taken from the respective output ports at the input side of the P/S converter 2, whereby the individual channel lines 201 through 208 can be monitored. Similarly, the pass pattern signal is input to the input port at the output side of the P/S converter 2 and then the thus input pass pattern signal is taken from the output port at the output terminal T22. If the output pass pattern matches with the input pass pattern ("01 01 01 . . . "), it is determined that no fault occurs on and along the path through which the pass pattern signal has travelled.

As mentioned above in detail, according to the prior art monitor equipment, the S/P and P/S converters 1 and 2 per se are not monitored. Further, as understood from many input ports and output ports of FIG. 1, there is an increase in the amount of hardware of monitor equipment.

The above problems of the prior art can be overcome by introducing a means that enables the pass pattern signal to pass through the S/P converter 1 and the P/S converter 2.

Figure 4:
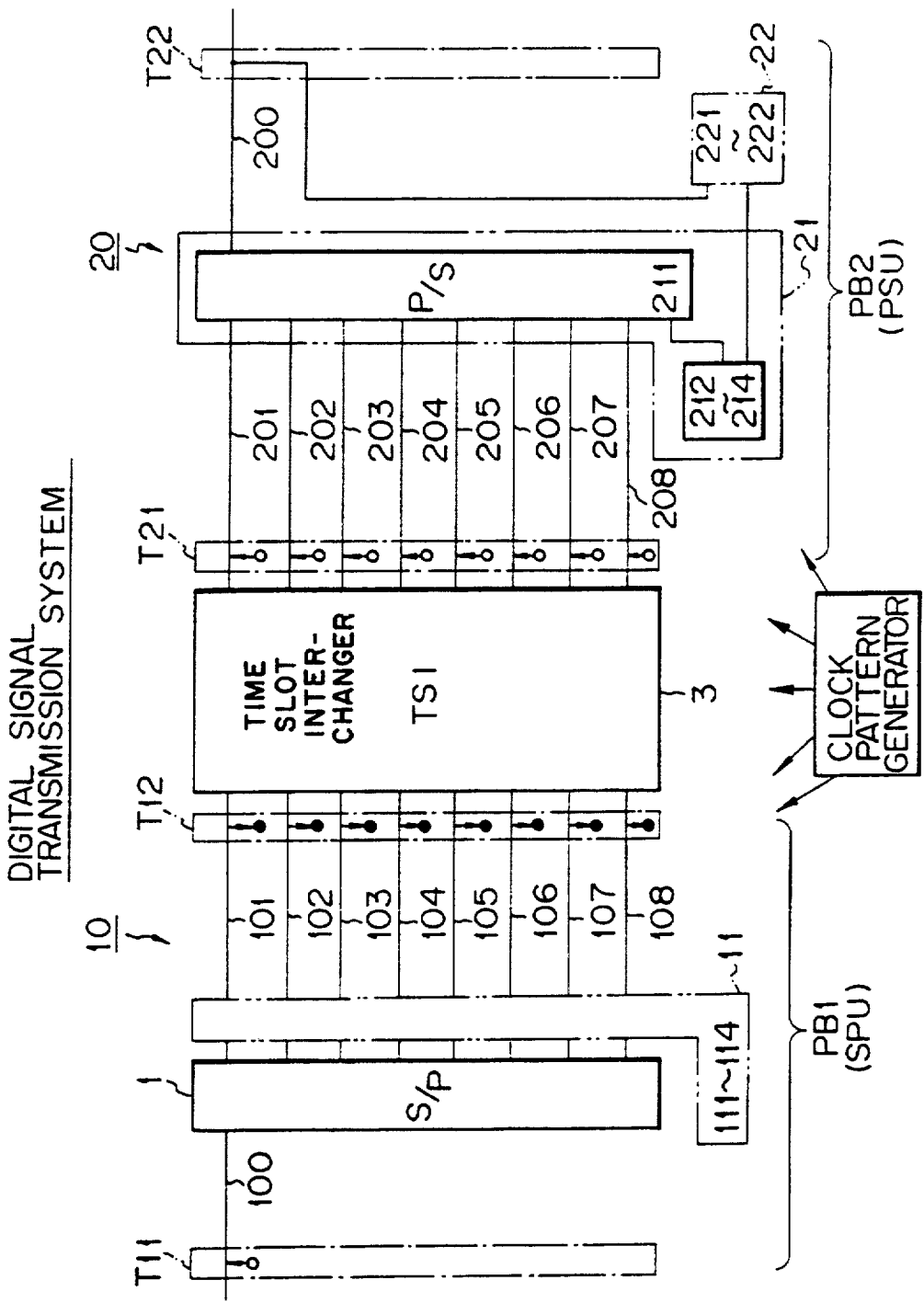
FIG. 4 is a principle construction view of a digital signal transmission system including monitor equipment according to the present invention.

FIG. 4 is a principle construction view of a digital signal transmission system including monitor equipment according to the present invention. Note that identical constituent members are represented by the same reference numerals and symbols throughout the figures. As seen from FIG. 1, the monitor equipment of the present invention is basically comprised of a first monitor means 10 and a second monitor means 20.

The first monitor means 10 for receiving parallel pass pattern signals passing through the S/P converter 1 and converting the same after conversion into a serial pass pattern signal, into plural sets of serial pass pattern signals to be applied parallel to respective individual channel lines 101 to 108 to achieve a S/P converter side pass pattern check.

The second monitor means 20 for receiving respective serial pass pattern signals sent via respective individual channel lines 201 to 208 and distributing each serial pass pattern signal through the P/S converter 2 to the multiplexed channel line 201 to 208 sequentially, frame by frame, to achieve a P/S converter side pass pattern check.

The first monitor means 10 is operative, on the printed board PB1, as follows. The serial signal as well as the serial pass pattern signal is applied to the input port at the input terminal T11 as in the prior art.

The first monitor means 10 cooperates with the existing S/P converter 1 and processes the output from the S/P converter 1 by a first monitor signal generating circuit 11 that generates parallel distributed serial pass pattern signals. The first monitor means 10 finally achieves a monitor of the pass pattern signals output from the output ports at the output terminal T12, as in the prior art, however, the pass pattern check according to the present invention is adopted not only for the lines 100 and 101 to 108, as in the prior art, but also the S/P converter 1 per se. Thus, one of the aforesaid problems can be overcome.

The second monitor means 20 is operative, on the printed board PB2, as follows. The parallel signals as well as the respective serial pass pattern signals are applied to respective input ports at the input terminal T21 as in the prior art. The second monitor means 20 is mainly set up by a second monitor signal generating circuit 21 and a pass pattern monitor circuit 22. The circuit 21 includes therein the existing P/S converter 2 to convert the serial pass pattern signals received from respective individual channel lines 201 to 208 into serial pass pattern signals to be output sequentially, frame by frame, on the multiplexed channel line 200. The sequential serial pass pattern signals are applied to the pass pattern monitor circuit 22 to sequentially achieve the pass pattern checks for each individual channel line 201 to 208. Thus the pass pattern check according to the present invention is adopted not only for the lines 201 to 208 and 200, as in the prior art, but also the P/S converter 2 per se. This overcomes one of the aforesaid problems.

In other words, the first means 10 including the S/P converter 1 can be expressed as a serial/parallel converting unit (SPU) and similarly the second monitor means 20 including the parallel/serial converter 2 can be expressed as a parallel/serial converting unit (PSU) (refer to characters "SPU" and "PSU" in FIG. 4).

The operation will be explained in more detail below. In the SPU of FIG. 4, the serial pass pattern signal is input to the input terminal T11 and is converted, gradually into parallel pass pattern signals by the S/P converter 1. The parallel pass pattern signals are applied to the first monitor signal generating circuit 11 to produce, first, serial pass pattern signals by sampling each parallel pass pattern signal sequentially at the same S/P conversion speed of the S/P converter 1 and then the thus sampled parallel pass pattern signals are multiplexed into plurality sets of serial pass pattern signals to be distributed parallel on respective individual channel lines 101 to 108. On the other hand, in the PSU of FIG. 4, the second monitor signal generating circuit 21 receives each serial pass pattern signal given from respective individual channel lines 201 to 208 and the respective serial pass pattern signals are sequentially output, individually on the multiplexed channel line 200. The pass pattern monitor circuit 22 achieves the pass pattern checks for each serial pass pattern signal sequentially frame by frame cyclicly.

Figure 6A:
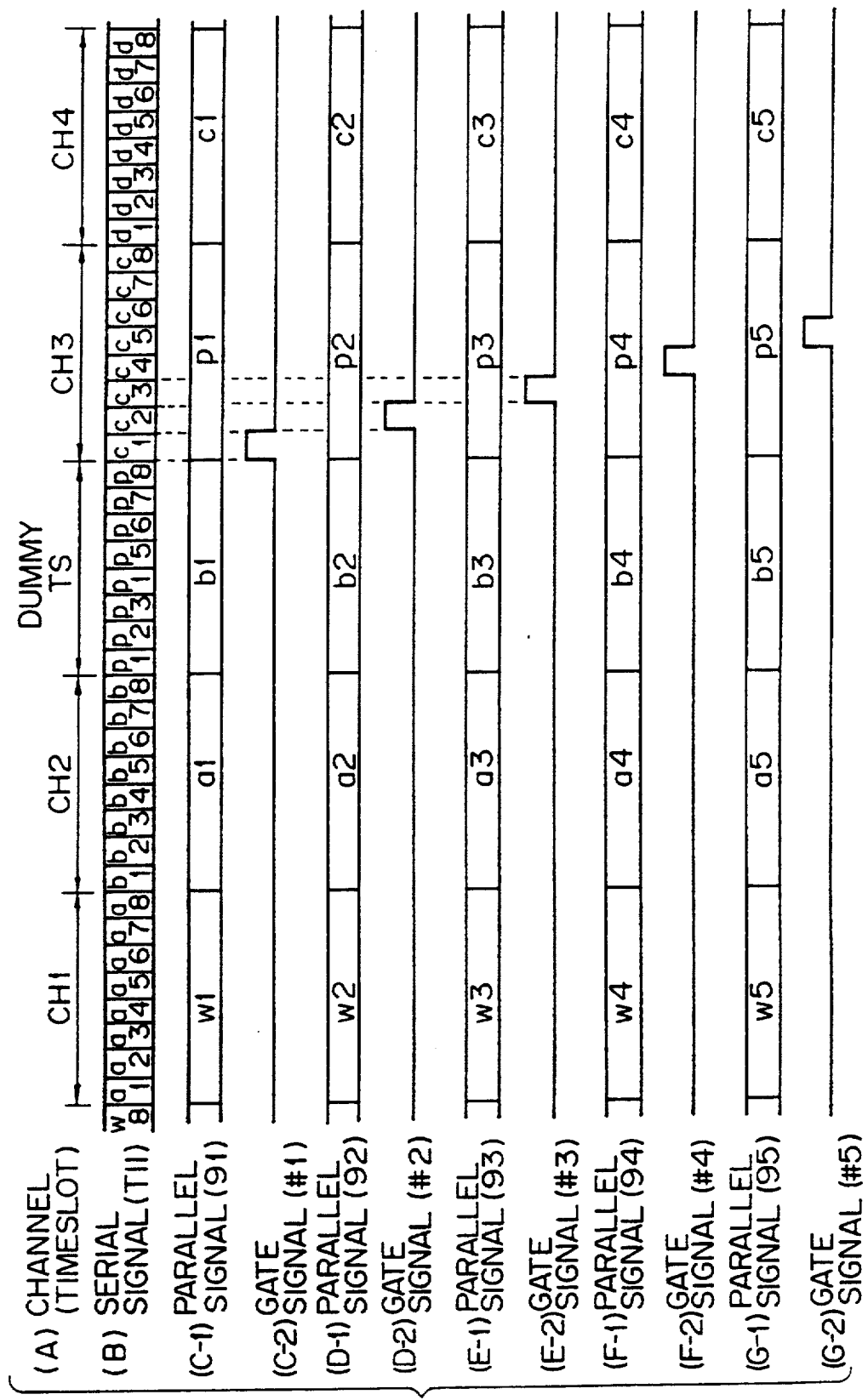

FIG. 5 is a circuit diagram of an example of a first monitor signal generating circuit 11 shown in FIG. 4 and FIG. 6A and 6B is a timing chart explaining the process of a generation of the first monitor signal.

In FIG. 5, the serial pass pattern (P·P) signal p1 to p8 (see row (B) of FIG. 6A) is input to the terminal T11 and reaches, via the line 100, the S/P converter 1, as well as the usual serial signals, such as a1 to a8, b1 to b8 and so on.

The serial P.P signal is applied to the terminal T11 every time a dummy time slot (TS) comes (see DUMMY TS in row (A) of FIG. 6A), in the form of 8 bit train p1 to p8. Note that each dummy time slot is necessary to adjust thee difference in speed between, e.g., 6 Mbps and 8 Mbps (see FIG. 3), in which no usual data signal exists.

The S/P converter 1 converts the serial signals of row (B) in FIG. 6A to parallel signals as shown in rows (C-1) to (J-1) of FIG. 6A and 6B. During the S/P conversion, the serial pass pattern (P·P) signal p1 to p8 of row (B) is converted, gradually into 8 parallel P·P signals (see p1 (C-1), p2 (D-1), p3 (E-1), p4 (F-1) ... p8 (J-1). These parallel P.P signals are input to the first monitor signal generating circuit 11.

The first monitor signal generating circuit 11 consists of a pass pattern extracting circuit 111, a pass pattern multiplexing circuit 112 and a timing control circuitry such as a frame counter (FRAME COUNT) 113, a decoder (DEC) 114.

The frame counter 113 receives a frame pulse signal and a clock (CLK) signal supplied from a clock pattern generator (see FIG. 4), to thereby generate a timing trigger necessary for producing gate signals (see rows C-2, D-2, E-2 ... J-2) and a timing trigger necessary for producing the timing signal (K) that specifies the time slot ("DUMMY TS") during which the parallel pass pattern signals (C-1, D-1, E-1 ... J-1) should be sampled to generate the serial P.P signal (see p1 to p8 in row (L), (M) ... (S)).

The above mentioned timing triggers are supplied to the decoder 114 to produce the above mentioned gate signals (C-2, D-2, E-2 ... J-2) and timing signal (K).

The pass pattern (P·P) extracting circuit 111 consists of AND gates 111-1 and an OR gate 111-2. The AND gates 111-1 are arranged in individual correspondence with the output bits of the S/P converter 1. The OR gate 111-2 multiplexes the outputs from the AND gates 111-1.

Namely, the serial P·P signal p1 to p8 of row (B) is reproduced by taking an AND operation at each AND gate (111-1) between the serial P·P signal from the S/P converter 1 and the respective gate signals (see row (C-2), (D-2) ... (J-2)) each having a bit width of the bits p1 to p8 in row (B).

The pass pattern multiplexing circuit 112 consists of the same number of selectors as the number of channel lines 101 and 108. The selectors receive respective parallel signals from the S/P converter 1 respectively and also receive the output signal from the pass pattern extracting circuit 111 commonly. Further the selectors are commonly supplied with the timing signal (shown in row (K) of FIG. 6B) from the decoder (DEC) 114. Thereby, the pass pattern multiplexing circuit 112 selectively produces parallel signals, such as a1 to a8, b1 to b8, c1 to c8 and so on, or the plurality sets of serial pass pattern signals, each composed of p1 to p8, at every term when the timing signal (K) is given, to be output to respective individual channel lines 101 to 108.

The parallel distributed serial pass pattern signals (see p1 to p8 in rows (L), (M) . . . (S) of FIG. 6B) are monitored at respective output ports of the output terminal T12 as in the prior art by the use of, e.g., a pulse pattern comparator.

By employing the first monitor signal generating circuit 11, the output port at the input side of the S/P converter 1 and the input ports at the output side thereof, which are necessary in the prior art, are no longer needed by the monitor equipment of the present invention.

Figure 7:
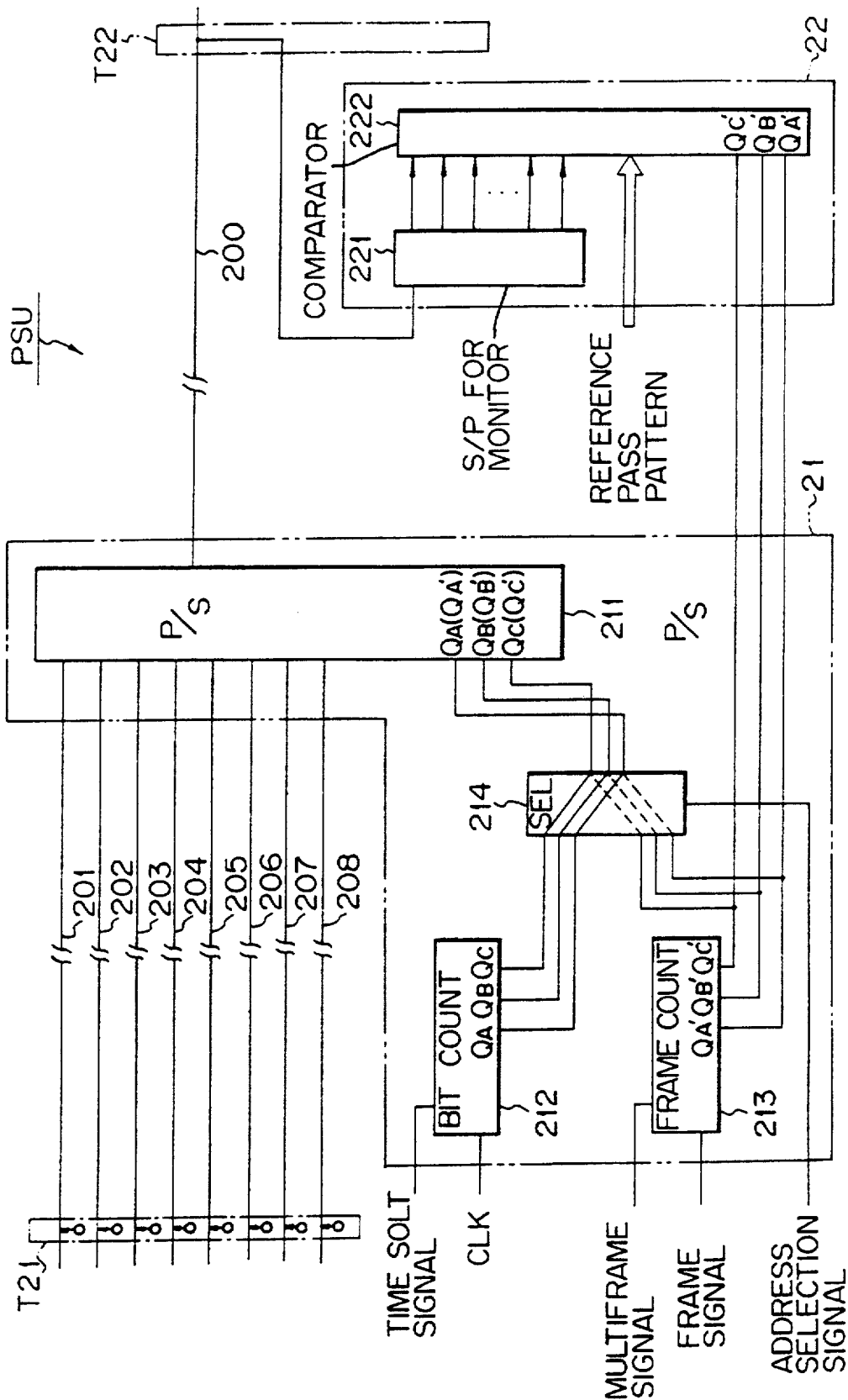
FIG. 7 is a circuit diagram of an example of the second monitor signal generating circuit 21 and the pass pattern monitor circuit 22 shown in FIG. 4.

FIG. 7 is a circuit diagram of an example of the second monitor signal generating circuit 21 and the pass pattern monitor circuit 22 shown in FIG. 4 and FIGS. 8A, 8B, 8C and 8D is a timing chart explaining the operations performed in the circuit shown in FIG. 7.

Figure 8B:
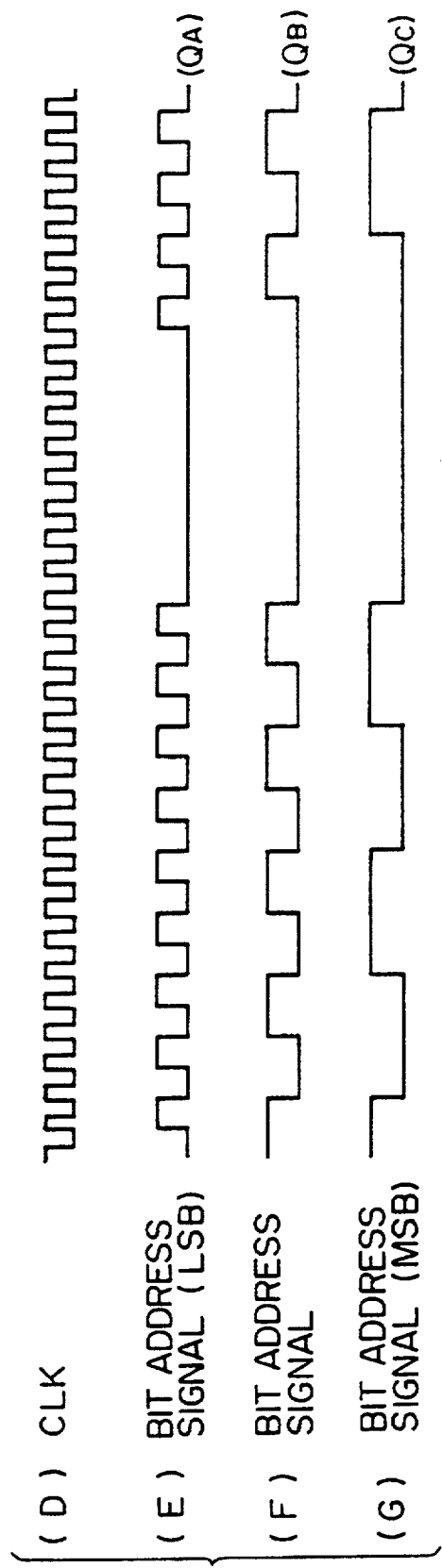

In FIG. 7, a bit counter (BIT COUNT) 212 receives a time slot signal (see row (C) of FIG. 8A) and a bit clock signal (CLK) (see row (D) of FIG. 8B) given from the aforesaid clock pattern generator (FIG. 4) and achieves an octal counting operation, and thereby bit address signals ($Q_A$, $Q_B$, $Q_C$) are produced therefrom as seen in rows (E), (F) and (G) of FIG. 8B. The bit address signal $Q_A$ is the least significant bit (LSB) of the output of the bit counter 212, and the bit address signal $Q_C$ is the most significant bit (MSB) thereof.

These bit address signals $Q_A$, $Q_B$ and $Q_C$ are applied, via a selector 214, to a selectable parallel/serial (P/S) converter 211 that includes an inherent function of the aforesaid P/S converter 2. The selectable P/S converter 211 converts the parallel signals (see a1 to a8, b1 to b8, c1 to c8 . . . shown in rows (B-1) to (B-8) of FIG. 8A) sequentially according to each combination of the bit address signals $Q_A$, $Q_B$ and $Q_C$, into the serial signals (see a1 to a8, b1 to b8 and so on as shown in rows (B-1) to (B-8) of FIG. 8C).

For example, if the bit address signals $Q_A$, $Q_B$ and $Q_C$ assume "000", the parallel signal a1 in row (B-1) of FIG. 8A is selected. Similarly if "100" is given, a2 of row (B-2) is selected. Thus, if the $Q_A$, $Q_B$ and $Q_C$ assume a 3 bit logic on the left side, the right side parallel signals are selected as shown below.

"010" - a3 (row (B-3) of FIG. 8A)

"110" - a4 (row (B-4) of FIG. 8A)

"001" - a5 (row (B-5) of FIG. 8A)

"101" - a6 (row (B-6) of FIG. 8A)

"011" - a7 (row (B-7) of FIG. 8A)

"111" - a8 (row (B-8) of FIG. 8A)

The thus selected parallel signals are multiplexed to be the serial signals a1 to a8 at the channel CH1 as seen in row (B-1) of FIG. 8B. Similarly, the parallel signals are multiplexed to be the serial signals b1 to b8 and c1 to c8 and so on at the channel CH2 and CH3, respectively as shown in row (B-1) of FIG. 8C.

The pass pattern signals p1 to p8, q1 to q8 . . . are treated as follows. The serial pass pattern signals applied to the individual channel lines 201 to 208 are sequentially output frame by frame to the multiplexed channel line 200 in the form of a multiframe system by means of the selectable P/S converter 211 and the frame counter 213.

Figure 8C:
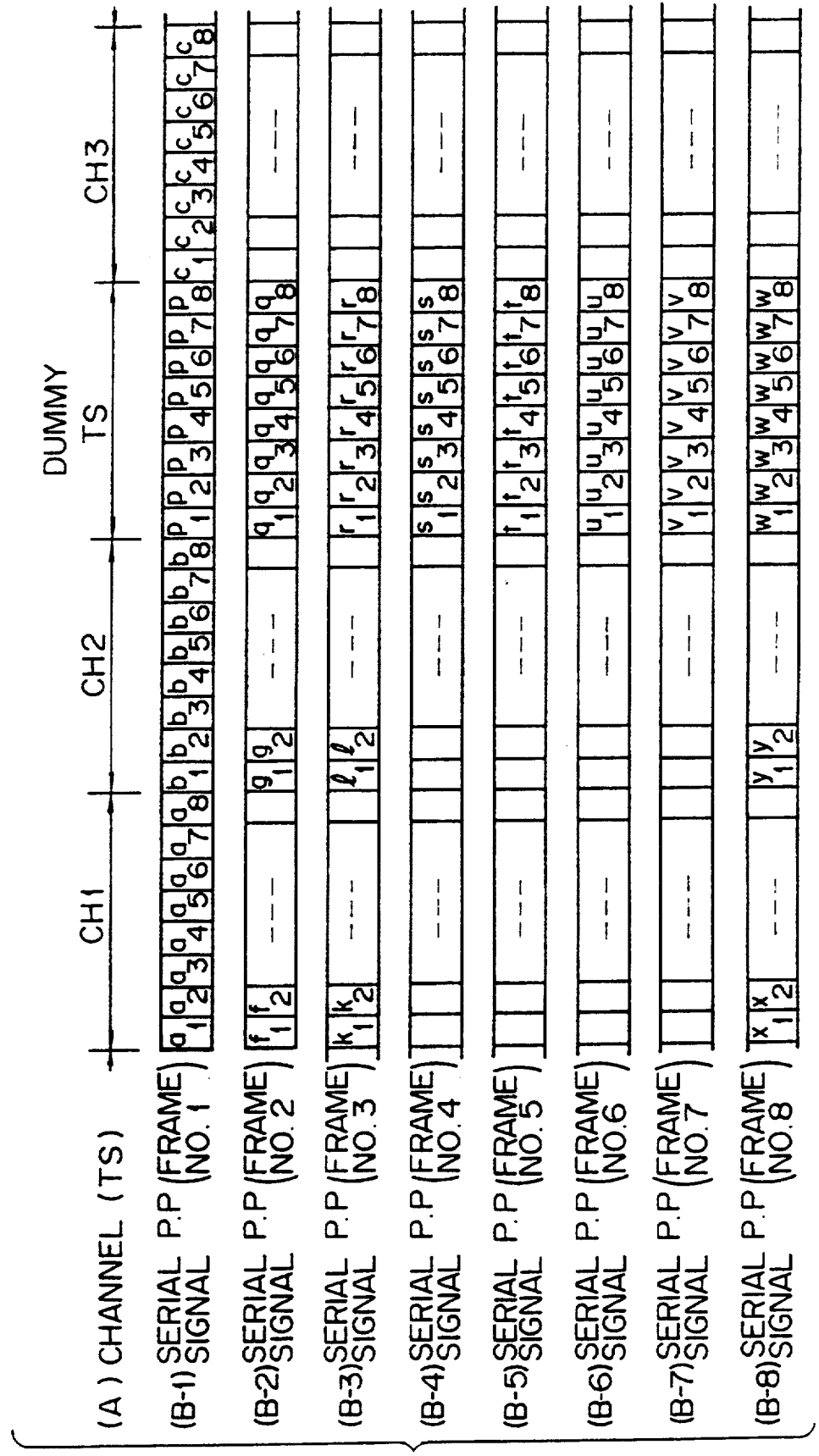

To facilitate an understanding of the frame and the multiframe, FIG. 8C is referred to. Each of the serial pass pattern signals is composed of 8 bits as shown in rows (B-1) to (B-8) of FIG. 8A, and therefore, each multiframe (see row (F) of FIG. 8D) is composed of 8 frames F1, F2 . . . F8 as seen in row (H) of FIG. 8D. The frame train F1, F2 . . . F8 can be schematically illustrated as shown in row (G) of FIG. 8D, where the dummy time slot in which the serial pass pattern signal is inserted is assumed to be positioned at each end part of the frames (F1, F2 . . . F8) as opposed to the location of the serial pass pattern signals (p1 to p8, q1 to q8 shown in FIG. 8A, since each frame is usually composed of, e.g., CH1, CH2, CH3 . . . CH30.

In row (G) of FIG. 8D, the bit concentrations of each serial pass pattern signal (p1 to p8, q1 to q8 . . . w1 to w8 in FIG. 8A) are expressed schematically as each set of vertical short lines at each end part of the frames.

In FIG. 7, the frame counter 213 consists of, e.g., an octal counter. The octal counter (213) is supplied with the multiframe signal and the frame signal both from the aforesaid clock pattern generator shown in FIG. 4. In response to the multiframe and frame signals, the frame counter (FRAME COUNT) 213 produces the frame address signals $Q_A'$, $Q_B'$ and $Q_C'$ as shown in row (B), (C) and (D) of FIG. 8D; the frame address signals are applied to the selector (SEL) 214. Thus the selector 214 receives the bit address signals $Q_A$, $Q_B$ and $Q_C$ from the bit counter 212 and the frame address signals $Q_A'$, $Q_B'$ and $Q_C'$ from the frame counter 213 and either one of the two sets of signals are selected by the address selection signal of row (E) in FIG. 8D, the signal of which is also supplied from the aforesaid clock pattern generator shown in FIG. 4.

Namely, the address selection signal indicates each timing corresponding to the occurrence of the dummy time slot (DUMMY TS) in which the serial pass pattern signals are inserted. Every time the address selection signal is generated (refer to each negative pulse shown in row (E) of FIG. 8D), the selector (SEL) 214 is switched to select the frame address signals $Q_A'$ $Q_B'$ and $Q_C'$. At this time, the selectable P/S converter 211, when receiving the signals $Q_A'$, $Q_B'$ and $Q_C'$, operates to produce the serial pass pattern signal, e.g., p1 to p8 of row (B-1) in FIG. 8C during a certain frame. During the next frame, the converter 211 produces, when receiving the next signals $Q'$, $Q_B'$ and $Q_C'$, the serial pass pattern signal, i.e., q1 to q8. The same operation will continue synchronously with the frame.

To be more specific, if the selectable P/S converter 211 receives, as the combination of the frame address signals $Q_A'$, $Q_B'$ and $Q_C'$, "000", "001", "010", "010", "100", "101", "110" and "111", the P/S converter 211 produces respectively the serial pass pattern signals p1 to p8 (row (B-1) of FIG. 8C), q1 to q8 (row (B-2) of FIG. 8C) and so on along with the advance of the frame. These serial pass pattern signals are sequentially applied, via the line 200, to the pass pattern monitor circuit 22. It should be noted that, in FIG. 8C, only the bit patterns at the dummy time slot are completely depicted for brevity.

The serial signals, including the serial pass pattern signals, are sent from the circuit 21 to the line 200. Among the serial signals, the serial pass pattern signals are checked through the output terminal T22 by the pass pattern monitor circuit 22. The circuit 22 consists of a serial/parallel converter for a monitor 221 and a pass pattern comparator 222.

The serial signals are branched at the output terminal T22 and applied to the pass pattern comparator 222 after conversion into parallel signals at the S/P converter for monitor 221.

The pass pattern comparator 222 receives the aforesaid frame address signals $Q_A'$, $Q_B'$, and $Q_C'$ and, in response to the combination of these signals $Q_A'$, $Q_B'$ and $Q_C'$, only the pass pattern signals, p1 to p8, q1 to q8 w1 to w8, are checked sequentially with reference to the corresponding reference pass patterns. The reference pass patterns are the same as the respective pass patterns that are input to the input terminal T21. Example of the pass patterns is shown below.

| p1 to p8: | 0 | 1 | 0 | 1 | 0 | 1 | 0 | 1 |
| q1 to q8: | 1 | 0 | 1 | 0 | 1 | 0 | 1 | 0 |
| r1 to r8: | 0 | 0 | 1 | 1 | 0 | 0 | 1 | 1 |
| s1 to s8: | 1 | 1 | 0 | 0 | 1 | 1 | 0 | 0 |
| t1 to t8: | 0 | 0 | 0 | 0 | 1 | 1 | 1 | 1 |
| u1 to u8: | 1 | 1 | 1 | 1 | 0 | 0 | 0 | 0 |
| v1 to v8: | 0 | 0 | 1 | 1 | 1 | 1 | 0 | 0 |
| w1 to w8: | 1 | 1 | 0 | 0 | 0 | 0 | 1 | 1 |

Figure 9:
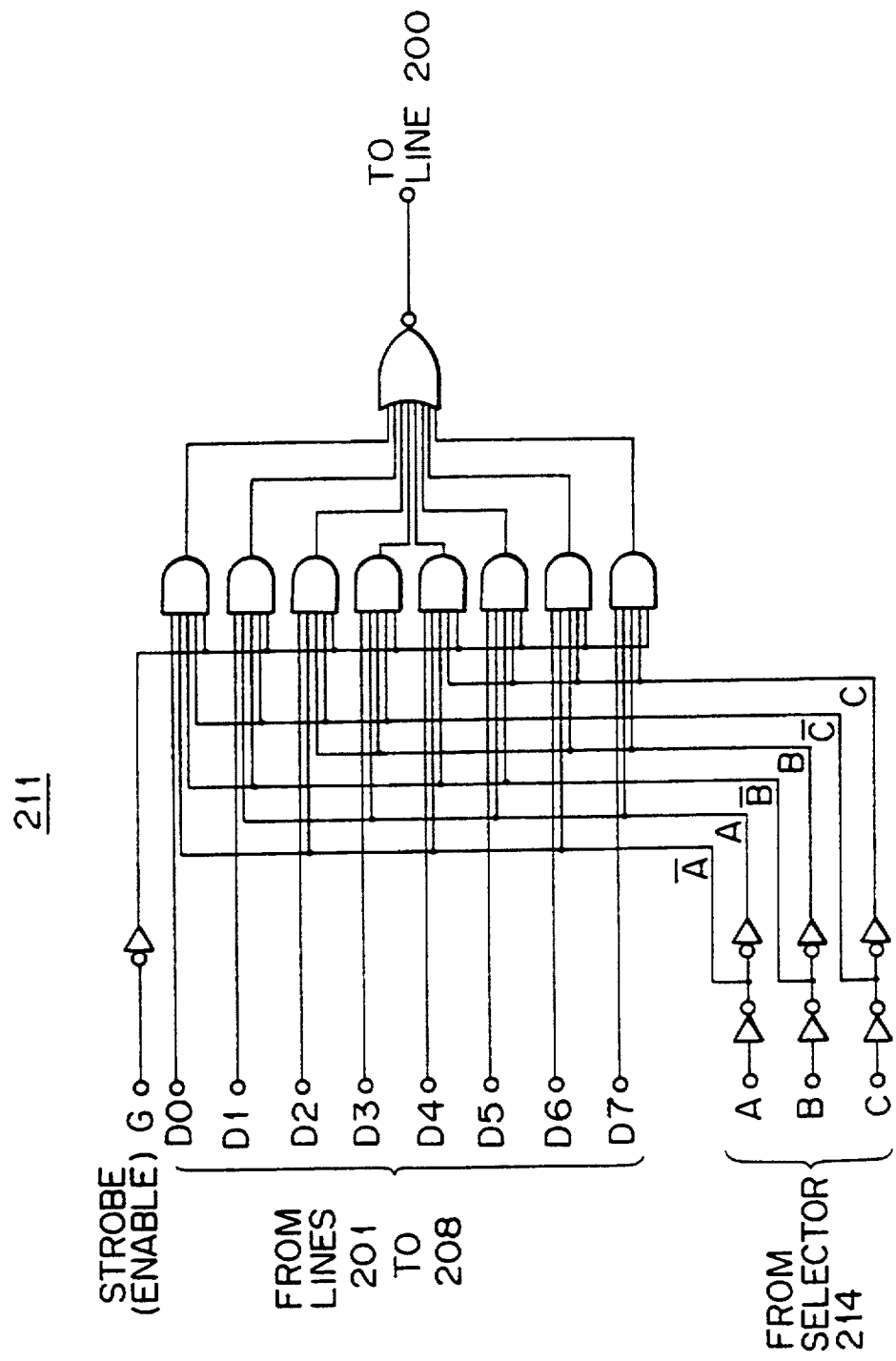
FIG. 9 is a circuit diagram of an example representing the selectable P/S converter 211 of FIG. 7.

FIG. 9 is a circuit diagram of an example representing the selectable P/S converter 211 of FIG. 7. The selectable P/S converter 211 can be constructed as an 8-line to 1-line data selector/multiplexer. Reference symbols D0 through D7 denote bit data.

As explained above in detail, the monitor equipment of the present invention enables a monitor of both the S/P converter 1 per se and the P/S converter 2 per se of the digital signal transmission system, and thus the reliability of the system can be greatly improved. Further, the amount of hardware for constructing the input ports and the output ports can be halved when compared with the prior art, thereby reducing the manufacturing cost.

We claim:

1. A digital signal transmission system having monitor equipment, the system including, at least, a serial/parallel, S/P, converter provided with a multiplexed channel line at an input side and individual channel lines at an output side, and a parallel/serial, P/S, converter provided with individual channel lines at an input side and a multiplexed channel line at an output side, said monitor equipment comprising:

an input for receiving pass pattern signals and outputting the pass pattern signals to the S/P converter;

first monitor means for receiving in parallel the pass pattern signals passing through the S/P converter and converting the same into plural sets of serial pass pattern signals to be applied in parallel to respective ones of the individual channel lines to achieve a S/P converter side pass pattern generation; and second monitor means for receiving respective serial pass pattern signals sent via respective ones of the individual channel lines and distributing each of said serial pass pattern signals through the P/S converter to the multiplexed channel line of the P/S converter sequentially, frame by frame, to achieve a P/S converter side pass pattern generation.

2. A system as set forth in claim 1, wherein said first monitor means comprises a first monitor signal generating circuit that converts serial pass pattern signals to be distributed in parallel on respective ones of the individual channel lines.

3. A system as set forth in claim 1, wherein said second monitor means comprises:

a second monitor signal generating circuit, including the P/S converter to convert the serial pass pattern signals received from respective individual channel lines into serial pass pattern signals to be output sequentially, frame by frame, on the multiplexed channel line; and a pass pattern monitor circuit for sequentially achieving a pass pattern check for each individual channel line.

4. A system as set forth in claim 2, wherein said first monitor means is operative, at its input side to input serial pass pattern signals inserted into usual serial signals for the pass pattern checks and includes, at its output side, output terminals from which respective serial pass pattern signals are output from respective individual channel lines.

5. A system as set forth in claim 4, wherein said first monitor signal generating circuit comprises:

a pass pattern extracting circuit, operative connected to the S/P converter, to convert the parallel pass pattern signals from the S/P converter into the serial pass pattern signal;

a pass pattern multiplexing circuit, operatively connected to said pass pattern extracting circuit, to output in parallel the serial pass pattern signals from said pass pattern extracting circuit on respective individual channel lines commonly; and timing control circuitry, operatively connected to said pass pattern extracting circuit and said pass pattern multiplexing circuit, for controlling said pass pattern extracting circuit and said pass pattern multiplexing circuit and for generating gate signals for creating the serial pass pattern signal at said pass pattern extracting circuit and also for generating a timing signal to specify every timing at which the serial pass pattern signal is to be output in parallel on the respective individual channel lines.

6. A system as set forth in claim 5, wherein said pass pattern extracting circuit comprises:

AND gates, connected at one of their inputs to respective outputs of the S/P converter and at the other one of their inputs, to receive the gate signals respective; and an OR gate, operatively connected to said AND gates, for receiving all of the outputs from said AND gates to provide the serial pass pattern signal.

7. A system as set forth in claim 5, wherein said pass pattern multiplexing circuit comprises selectors that receive the serial pass pattern signal from said pass pattern extracting circuit and the parallel signals from the S/P converter and output either one of the thus received signals when the received pass pattern signals are selected by said selectors when the timing signal is input commonly thereto.

8. A system as set forth in claim 3, wherein said second monitor means is provided with, at its input side, input terminals to receive respective serial pass pattern signals on the individual channel lines together with respective parallel signals and is provided with an output terminal through which said pass pattern monitor circuit is connected to the multiplexed channel line.

9. A system as set forth in claim 8, wherein said second monitor signal generating circuit further comprises:
- a bit counter producing bit address signals for enabling the P/S converter to convert respective parallel signals into serial signals to be applied to the multiplexed channel line; and
- a frame counter producing frame address signals for enabling the P/S converter to output respective serial pass pattern signals frame by frame, which are applied to the multiplexed channel line.

10. A system as set forth in claim 9, wherein the P/S converter is formed as a data selector controlled by the bit address signals and the frame address signals that are selectively applied to the data selector by a selector that is switched by an address selection signal that indicates every timing at which each pass pattern signal exists.

11. A system as set forth in claim 8, wherein said pass pattern monitor circuit comprises:
- a serial/parallel converter for a monitor, the serial/parallel converter receiving each serial signal output from the multiplexed channel line and converting the same into parallel signals; and
- a pass pattern comparator for comparing the thus converted parallel signals with the respective reference pass patterns to achieve a pass pattern check, every time the pass pattern signal is applied thereto.

* * * * *

UNITED STATES PATENT AND TRADEMARK OFFICE
CERTIFICATE OF CORRECTION

PATENT NO. : 5,369,633
DATED : NOVEMBER 29, 1994
INVENTOR(S) : Akira MARUYAMA, et al.

It is certified that error appears in the above-indentified patent and that said Letters Patent is hereby corrected as shown below:

TITLE PAGE, [57] ABSTRACT, line 3, "converter both." should be --converter.--.

Col. 1, line 27, "socalled" should be --so-called--.

Col. 3, line 25, "10" should be deleted.

Col. 8, line 57, "Q', $Q_B$'" should be --$Q_A$', $Q_B$'--.

Col. 10, line 31, "operative" should be --operatively--;
line 36, "circuit," should be --circuit--.

Signed and Sealed this

Fourteenth Day of March, 1995

Attest:

BRUCE LEHMAN

Attesting Officer     Commissioner of Patents and Trademarks